US009545768B2

(12) United States Patent
Lamkemeyer et al.

(10) Patent No.: US 9,545,768 B2
(45) Date of Patent: Jan. 17, 2017

(54) DEVICE AND A METHOD FOR PROCESSING SEMIFINISHED BAG PRODUCTS, AND GLUING STATION FOR SEMIFINISHED BAG PRODUCTS

(75) Inventors: Andreas Lamkemeyer, Georgsmarienhuette (DE); Marco Daher, Bramsche (DE); Ralf Klang, Lengerich (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 1017 days.

(21) Appl. No.: 13/126,252

(22) PCT Filed: Oct. 22, 2009

(86) PCT No.: PCT/EP2009/063842

§ 371 (c)(1),
(2), (4) Date: Jun. 20, 2011

(87) PCT Pub. No.: WO2010/049335

PCT Pub. Date: May 6, 2010

(65) Prior Publication Data

US 2011/0259516 A1 Oct. 27, 2011

(30) Foreign Application Priority Data

Oct. 27, 2008 (DE) ........................ 10 2008 053 280
Oct. 28, 2008 (EP) .................................... 08167751

(51) Int. Cl.

| | |
|---|---|
| ***B32B 41/00*** | (2006.01) |
| ***B31B 19/62*** | (2006.01) |
| ***B05B 13/02*** | (2006.01) |
| ***B05C 1/02*** | (2006.01) |

(Continued)

(52) U.S. Cl.

CPC ........... *B31B 19/62* (2013.01); *B05B 13/0221* (2013.01); *B05C 1/027* (2013.01); *B31B 29/00* (2013.01);

(Continued)

(58) Field of Classification Search

CPC ............. B31B 19/62; B31B 2219/6007; B31B 2221/20; B31B 2219/95; B31B 2221/405; B05C 5/027; B05C 5/0279

(Continued)

(56) References Cited

U.S. PATENT DOCUMENTS

| | | | | |
|---|---|---|---|---|
| 3,448,666 A * | 6/1969 | Gunnerich et al. | ........... | 493/332 |
| 5,558,612 A * | 9/1996 | Blumle | ......................... | 493/177 |

(Continued)

FOREIGN PATENT DOCUMENTS

| | | |
|---|---|---|
| DE | 37 448 | 3/1965 |
| DE | 1 461 881 | 4/1969 |

(Continued)

*Primary Examiner* — Michael N Orlando
*Assistant Examiner* — Joshel Rivera
(74) *Attorney, Agent, or Firm* — Jacobson Holman, PLLC.

(57) ABSTRACT

An apparatus and a method for the processing of semi-finished sacks and a gluing station for semi-finished sacks include a feed element and a guide element. Semi-finished sacks having more complicated shapes, such as tubular pieces having open bottom squares with valve patches inserted therein, tend to be subjected to a partial gluing process or even suffer damage during the process of glue application in the nozzle clearance. Therefore, at least one feed element is provided, which is disposed upstream of a glue-application gap in the transport direction of the semi-finished sacks, and which together with the guide element defines a feed region of the semi-finished sacks to the application head. Components of the semi-finished sacks are guided through the feed region, which tapers in the transport direction of the semi-finished sacks.

20 Claims, 8 Drawing Sheets

(51) Int. Cl.
*B31B 29/00* (2006.01)
*B31B 29/60* (2006.01)

(52) U.S. Cl.
CPC ............ *B31B 29/60* (2013.01); *B31B 2219/60* (2013.01); *B31B 2219/6007* (2013.01); *B31B 2221/20* (2013.01); *B31B 2221/405* (2013.01); *Y10T 156/1702* (2015.01)

(58) Field of Classification Search
USPC .. 156/60, 290, 291, 539, 547, 578; 118/324; 493/264, 276, 285, 331
See application file for complete search history.

(56) References Cited

U.S. PATENT DOCUMENTS

| | | | | |
|---|---|---|---|---|
| 7,618,360 B2 | | 11/2009 | Daher et al. | |
| 2006/0048899 | A1* | 3/2006 | Duwendag et al. | 156/547 |
| 2010/0304032 | A1* | 12/2010 | Duwendag et al. | 427/421.1 |

FOREIGN PATENT DOCUMENTS

| | | |
|---|---|---|
| DE | 30 20 043 | 12/1981 |
| DE | 81 33 360.9 | 4/1982 |
| DE | 90 14 548.8 | 1/1991 |
| DE | 103 09 893 | 4/2004 |
| DE | 10 2007 057 820 | 6/2009 |
| EP | 1 648 688 | 4/2006 |
| GB | 2 331 150 | 5/1999 |
| JP | 05-345374 | 12/1993 |
| WO | WO 2004/048003 | 6/2004 |
| WO | WO 2005/002837 | 1/2005 |
| WO | WO 2009068572 A1 * | 6/2009 |

* cited by examiner

DEVICE AND A METHOD FOR PROCESSING SEMIFINISHED BAG PRODUCTS, AND GLUING STATION FOR SEMIFINISHED BAG PRODUCTS

CROSS-REFERENCE TO RELATED APPLICATION

This is a U.S. national stage application of PCT/EP09/063,842 filed Oct. 22, 2009, and published in German.

BACKGROUND OF THE INVENTION

1. Field of Invention

The invention relates to an apparatus and a method for the further processing of semi-finished sacks and a gluing station for semi-finished sacks.

2. Description of the Prior Art

Apparatuses for the further processing of semi-finished sacks are used in the production of a wide variety of sacks. The term "method for the further processing of semi-finished sacks" is understood to mean that at least one portion of the process steps occurring between the presence of the sack material and the formation of the finished sack is part of the method.

Sacks produced by means of the overall method include, for example, the so-called valve sacks, into which valve patches are usually inserted during the production of the sack bottoms. The bottoms themselves are frequently in the form of cross-bottoms such as those described, for example, in DE 090 145 48 U1 and DE 3020043 A1. In order to impart a property of permanent coherence to the bottoms and the valve patches inserted therein, parts of the sack bottoms are stuck to each other and/or to the valve patches with the help of glue.

For this purpose, either the regions of the bottom folds or the valve patches assigned thereto to be glued, that is, all the regions that are to be stuck together, are provided with a trace of glue and then stuck to each other by merging and folding them together.

The application of a trace of glue in the proper format is usually carried out in that a format part attached to a rotating roller is brought into contact with a gluing roller or other glue-storing or glue-transferring components during a rotation of the roller and, in doing so, provided with glue. In the further course of the roller rotation, the format plate transfers the glue stored thereon to regions of the subsequent sack bottoms or valve patches that are to be glued. For this purpose, the format part is provided with characteristic ridges that are adapted to a defined sack format. The format parts are replaced for the production of sacks having other formats on the bottoming apparatus. This type of production of traces of glue over the entire surface of semi-finished sacks has proved useful since it enables, inter alia, large amounts of starch-based adhesive that is difficult to handle to be applied in a clean manner and in the proper format.

The term, "application of a trace of glue in the proper format" is understood to mean a form of application that is adapted to suit the type and format of the sack. In this form of application, glue is usually applied over the entire surface of semi-finished sacks, special significance often being accorded to the edges of the format for the durability and the impermeability of the sacks.

However, the associated disadvantage is that this method of glue application makes it necessary to provide a plurality of glue-transfer components, for instance the forming rollers and the format parts for these apparatuses and also again clean the same after use.

Therefore bottoming apparatuses have been disclosed more recently that dispense with such types of format parts. Thus EP 1 648 688 B1 discloses a bottoming apparatus comprising a gluing station, in which a plurality of application heads extrude glue onto semi-finished sacks. For this purpose, a plurality of glue valves is attached to each of these application heads. One or more glue-outlet openings, from which glue is discharged onto the sack components, are assigned to these glue valves.

The application of a trace of glue in the proper format is now carried out in that a control unit selectively activates these glue valves. In this way, a wide variety of glue profiles can be realized and it is no longer necessary to provide a large number of format parts.

DE 103 09 893 A1 also discloses a similar teaching. It can be learned from both documents that glue is applied to semi-finished sacks in a bottoming apparatus comprising a gluing station that has a glue-application head. It can further be concluded that the semi-finished sacks are guided past the application head by means of at least one guide element in such a way that glue can be applied to them.

This is also the case in the apparatuses disclosed in WO 2004/048003 A1 and GB 2 331 150 A.

However, the present invention has shown that particularly semi-finished sacks having more complicated shapes—such as tubular pieces comprising open bottom squares and in this case particularly tubular pieces comprising open bottom squares and valve patches inserted therein—also tend in these apparatuses to be subjected to a partial gluing process or even suffer damages during the process of glue application in the nozzle clearance.

SUMMARY OF THE INVENTION

It is therefore the object of the present invention to improve the quality of the sacks, to which glue is applied in a bottomer provided with at least one application head, and to reduce the reject rate.

According to the present invention, this object is achieved in that the feed element and guide element features described herein are added to a bottomer having the features also described herein.

For purposes of the present invention, semi-finished sacks are components of sacks that are required for the production of sacks. More particularly in the case of cross-bottom sacks, these sack components include, inter alia, tubular pieces, and all possible types of slips, the term "slip" in this case also referring to bottom caps. The following description illustrates primarily open bottom squares with and without valve patches. Strictly speaking, these semi-finished sacks are components of tubular pieces since they do not yet comprise added and glued bottoms. Bottomers provide tubular pieces with sack bottoms. Cross-bottom sacks or cross-bottom valve sacks such as those described above are known to the skilled person.

For purposes of this application, an application head is a tool for the application of glue. As shown in the aforementioned documents EP 1 648 688 B1 and DE 103 09 893 A1, this tool for glue application is usually not rotated, but instead it is stationary during the process of glue application while the semi-finished sack in question is guided past the application head.

Such application heads often enable the production of variable patterns of glue application. This can be effected, inter alia, by activating valves or by altering the application width of a slot nozzle.

For purposes of the present document, the term "guide element" is any element that is involved in the transport of the semi-finished sacks in the relevant region of a bottoming apparatus. Usually, belts, rollers, bars and sheet plates are involved in the transport and guidance of the semi-finished sacks. In the functional connection in question here, it depends primarily on the regions of the semi-finished sack, to which glue is to be applied. Usually, the guide element has an interdependence, at least in part, with the feed element. The feed element and the guide element define the feed region of the semi-finished sack to the gluing station (location or region of glue application). Advantageously, this feed region also guides components of the semi-finished sack, to which glue is applied subsequently, and/or parts, to which glue is not applied.

In the case of open bottom squares, large sections of the bottom squares are usually among sack components, to which glue is to be applied. The guide element and the feed element need not enclose the entire semi-finished sack, but instead only portions thereof (cf. above).

By virtue of the taper of the feed region in the transport direction of the sacks, components of the semi-finished sacks that are guided through the feed region are exposed successively to a pressing power.

The still unpublished German patent application of file number 10 2007 057 820 discloses a bottoming apparatus, the gluing station of which comprises an application head that comprises glue valves for the application of a trace of glue to the semi-finished sacks. The semi-finished sacks, to which glue is to be applied, are fed here by means of a transport device to the gluing station, the sack components being positioned against the application head by means of a force with the help of a suitable counter-bearing so that the starch-based adhesive that is customary in the production of sacks is entrained or drawn uniformly by the sack components. The teaching of the present document can be combined very effectively with the teaching disclosed in the aforementioned patent application.

Therefore the contents of the unpublished German patent application of file number 10 2007 057 820 referring to the counter-bearing of the gluing station are incorporated into this patent application by reference. The inventors expressly reserve the right to use these contents for complementing the teaching of the present document. Portions of the aforementioned unpublished German patent application are also incorporated into the description and figures of the present document as components thereof.

The measures described in the present document prevent the sack components from being damaged when being positioned or pressed against the application head or the nozzle bar of the gluing station. Particularly when these semi-finished sacks are made of multilayered or freshly glued components, there can be incidences where the sack material gets folded or the freshly glued components of the semi-finished sacks are displaced relative to each other. The latter is referred to by the skilled person as the semi-finished sacks being "torn to pieces."

However, the measures of the invention suggested in the present document achieve the aforementioned object even when there is no counter-bearing present as the one provided in the unpublished German patent application of file number 10 2007 057 820 and when, for example, an application head sprays the glue on the semi-finished sacks, and thus an incomplete application of glue to any folded sack material is prevented.

During their transport along the processing stations of a bottomer of the invention (more particularly, the transport to the gluing station), the semi-finished sacks are guided between a retaining belt or a retaining rod—which bears on one side, mostly at the center, of the semi-finished sacks—and a guide element, such as a table sheet—which is located on the other side of the semi-finished sack. Only the regions, where the semi-finished sack enters the operating area of a processing station, for example, a creasing station and a press-forming station (described below in further detail), are not located on the table sheet. Likewise, (specific) guide elements for the semi-finished sacks are located in the processing stations. The region between the retaining belt and the guide element (table sheet or supporting element for the processing station) is referred to as the feed region of the semi-finished sack.

Before the semi-finished sacks are fed to the gluing station, they mostly travel through a creasing station. Here, individual regions of the semi-finished sacks are provided with a crease line in order to facilitate a subsequent folding process of the same. In the case of cross-bottom sacks, for example, two crease lines are made above and below the bottom centerline. The region between the respective crease lines and the outer edge of the cross-bottom is referred to as the bottom flap. The crease lines enable the bottom flaps to be folded back along the crease lines after the gluing process.

After the creasing station, the bottom flaps are no longer located in the same plane as the region between the crease lines. This is referred to by the skilled person as a "protrusion" of the bottom flaps. When introducing the cross-bottom that is to be glued and that comprises "protruding bottom flaps," the bottom flaps can get crumpled in the glue-application gap—if the latter is present. This can result in sack bottoms of poor quality or even rejects. It therefore makes sense to align the plane of the semi-finished sacks to be glued relative to the plane of the glue-application gap of the gluing station.

Also when gluing cross-bottoms, to which slips (bottom slips, valves) have been glued beforehand, it makes sense to merge the different layers of material (bottom and slip) before the entry of the semi-finished sack into the glue-application gap in order to prevent the slip that is freshly glued to the sack bottom from being torn to pieces.

At least one feed element disposed upstream of the location of glue application in the transport direction of the sacks is therefore provided in the bottomer of the invention for introducing the semi-finished sacks into the glue-application gap and aligning them thereto. This feed element together with the at least one guide element (often a table sheet) defines a feed region of the semi-finished sacks to the glue-application gap, which feed region tapers in the transport direction of the semi-finished sacks. As a result of the feed element, the sack components are aligned so as to extend parallel to the guide element—and thus to the plane of the glue-application gap—during their transport to the gluing station.

In an advantageous embodiment, the at least one gluing station can be a gluing station intended for gluing the sack bottom provided with a valve patch.

The gluing station is suitable for applying glue to the sack bottom by virtue of its structure. Its ability to be retrofitted in a bottoming apparatus is ensured by a plurality of mechanical and electrical interfaces to the bottoming apparatus in question. Thus such a gluing station can be constructed such that the transport medium guiding the semi-finished sacks through the bottomer that is to be retrofitted can also access the gluing station.

A particularly preferred embodiment of the invention comprises an additional gap, preferably a roller gap, which is disposed upstream of the feed element and the glue-application gap in the transport direction of the sacks and in which pressure can be applied to at least a portion of the surfaces to be glued. The pair of rollers that forms this additional roller gap is also referred to as press-forming device. At least one roller of the pair of rollers can be driven separately. When crossing through the press-forming device, for example, the "protrusion" of the bottom flaps (caused beforehand by the creasing station) is reduced in that the semi-finished sacks are pressed in the roller gap (within the original plane of the semi-finished sacks).

Advantageously, the semi-finished sack that has traveled through the press-forming device is guided again between the table sheet and a retaining belt. The distance between the table sheet and the retaining belt is larger than the roller gap of the press-forming device. Furthermore, only a portion of the surface of the bottom square is guided between the table sheet and the retaining belt. Therefore, the guide region for the semi-finished sacks initially expands greatly downstream of the press-forming device in order to again taper in the region of the feed element.

In a preferred embodiment of the bottomer, the expansion of the guide region for the semi-finished sacks downstream of the press-forming device is a hundred times, more preferably ten to fifty times the roller gap of the press-forming device.

Upstream of the additional gap, the semi-finished sack is usually guided without an alteration in the thickness of the guide region in the transport direction (e.g. no taper).

In an advantageous embodiment of the invention, the angle formed between the at least one guide element and the at least one feed element in the tapering region is in the range of 1° and 45°, more preferably between 3° and 15°. In a particularly advantageous embodiment of the invention, the angle is approximately 10°.

Advantageously, the feed element is resilient. This means that the feed element is pliable under the action of force and assumes its original shape after the end of the force action.

In order to achieve a good degree of resilience, the feed element is advantageously made of sheet metal, preferably spring steel sheet.

However, there are applications in which stainless steel can be used advantageously as a component of the feed element. Particularly in the use of at least one rigid feed element, it is possible to position the same against the semi-finished sacks with the help of spring elements.

In an advantageous embodiment, the gluing station comprises at least two glue-application heads. In this case, there is also a feed element provided for each glue-application head. In the case of two application heads, the gluing station thus comprises at least two feed elements for gluing an open bottom square.

It is advantageous to provide the at least one feed element and/or the at least one guide element disposed at the height of the feed element in the transport direction of the semi-finished sacks with recesses that make it possible to identify whether undesirable material is located in the feed region of the semi-finished sacks to the application head or to the location of glue application. Components of defective semi-finished sacks often constitute such undesirable material.

It is advantageous to adjust the width of the semi-finished sacks upstream of or in the feed region. The use of expander rollers appears advantageous for this purpose. Additional advantages can be achieved if the delimiting elements of the feed region themselves, such as the feed element and/or the guide element, comprise surface structures such as slots, grooves or ridges that apply the corresponding width-adjusting force to the semi-finished sacks during their movement in the transport direction. When processing semi-finished sacks comprising open bottom squares, the forces must act in a direction directed away from the bottom centerline.

It is cost-effective to configure the aforementioned recesses such that the surface of the recesses that is oriented toward the semi-finished sacks obtains these force-transferring properties. For this purpose, these recesses can be directed away from the bottom centerline in the transport direction of the semi-finished sacks—similarly to the slots, grooves or ridges, when the feed element supplies open bottom squares.

A gluing station of the invention comprising at least one counter-bearing and a feed element that tapers in the transport direction of the semi-finished sacks should be configured such that it (gluing station) can be retrofitted in bottomers known in the prior art.

Additional exemplary embodiments of the invention are revealed in the following description and claims.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
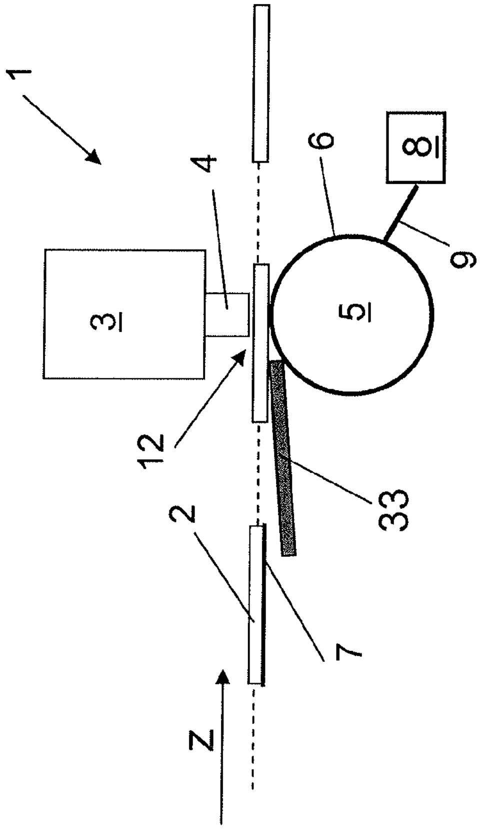
FIG. 1 is a sketch of a first exemplary embodiment of a gluing unit of the invention

FIG. 1 shows a sketch of a first exemplary embodiment of a gluing unit 1 of the invention, to which sack components 2 are fed in the direction of movement z. A significant component of the gluing unit 1 is the application head 3 comprising the nozzle bar 4, which the counter-bearing 5 counteracts mechanically. The counter-bearing 5 is in the form of a rotating roller, of which the active surface 6 that is in contact with the reverse side 7 of the sack component 2 and that applies the necessary force to the sack component 2 for positioning the same against the nozzle bar is wiped off by the doctor blade device 8 comprising the doctor blade 9 during each rotation of the counter-bearing 5.

Figure 2:
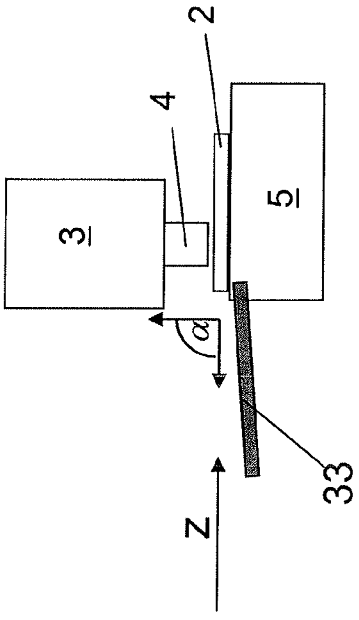
FIG. 2 is a view of the counter-bearing (roller) shown in FIG. 1

FIG. 2 is another view of the counter-bearing 5 shown in FIG. 1. Here, the active surface 6 is divided by slots 10 into surface segments 11. This division enables sack components comprising structured surfaces and a characteristic topography having significant height differences to be better positioned against the nozzle bar.

The counter-bearing 5 that is in the form of a roller has pins 13, on which it 5 can be mounted.

Figure 3:
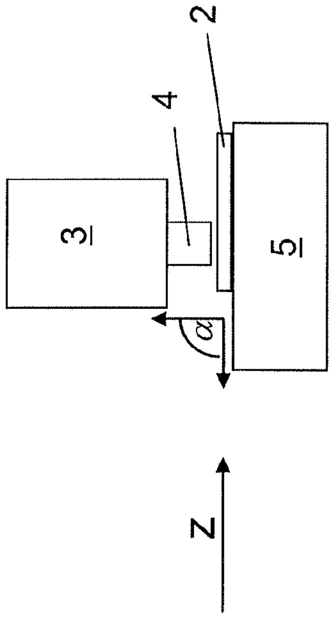
FIG. 3 is a sketch of a second exemplary embodiment of a gluing unit of the invention

FIG. 3 shows another exemplary embodiment of a gluing station of the invention that likewise comprises an application head 3 comprising a nozzle bar 4, by means of which glue is applied to the sack components 2. The angle α is the angle at which the sack components enter the glue-application gap 12 formed by the nozzle bar 4 and the counter-bearing 5. The counter-bearing 5 is shown in a stylized form in FIG. 3 and can be realized in the form shown in FIGS. 4, 5, 6, and 11.

Figure 4:
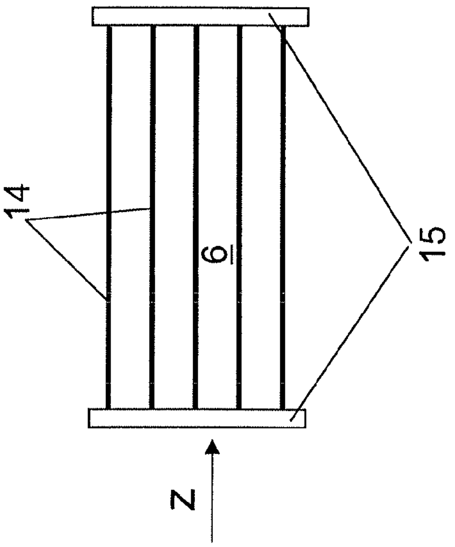
FIG. 4 is a top view of the active surface of the counter-bearing of the gluing unit shown in FIG. 3

In FIG. 4, the belts 14 are the elements that define the active surface 6 of the counter-bearing 5. The surface components of the belts 14 that come into contact with the sack components 2, when the latter are guided over the belts 14, form the active surface 6 in this case. The belts can be guitar strings that are oriented substantially parallel to each other as shown in FIG. 4 and are subjected to a defined (low) mechanical stress. The guitar strings or belts 14 are articulated to the legs 15. In this embodiment, it is also advantageous to align the belts such that they extend along the direction of travel of the sack components.

The active surface 6 formed by the belts 14 is segmented since the belts are disposed at a distance from each other.

Figure 6:
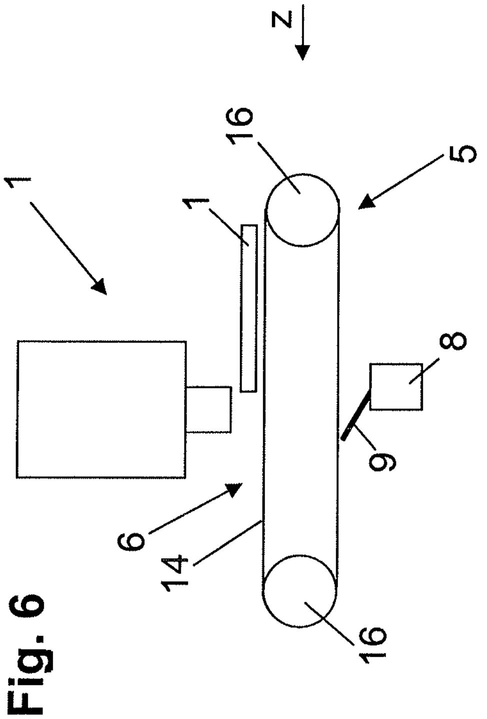
FIG. 6 is a sketch of a third exemplary embodiment of a gluing unit of the invention

FIG. 6 shows an additional gluing station comprising another counter-bearing 5 that in turn comprises belts 14, of which the surface components coming into contact with the sack components 2 form the active surface 6. Unlike the exemplary embodiment shown in FIG. 4, the belts are guided by the guide rollers 16 and moved in the direction of movement z of the sack components 2. The belts guided in this way are again wiped off by the doctor blade device 8 comprising the doctor blade 9.

Figure 5:
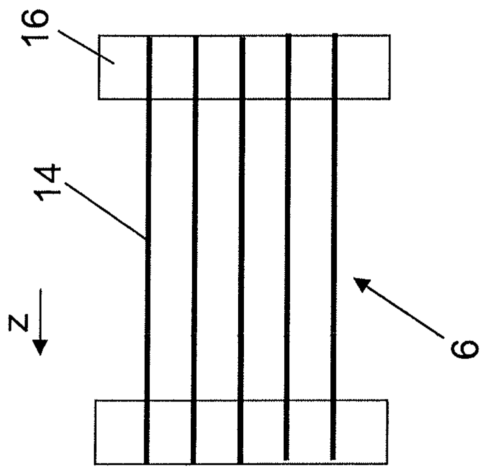
FIG. 5 is a top view of the active surface of the counter-bearing of an additional gluing unit shown in FIG. 6

FIG. 5 shows the active surface 6 when viewed from the application head 5, which active surface 6 is formed by the belts 14 traveling on the guide rollers 16.

Figure 7:
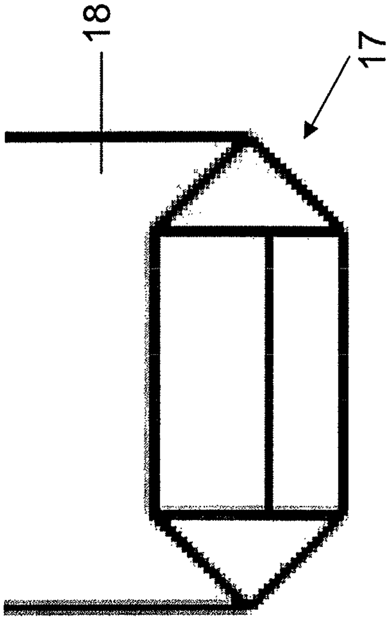
FIG. 7 shows the bottom of a cross-bottom valve sack

FIG. 7 shows the bottom 17 of a cross-bottom valve sack 18. The figure illustrates that the folding edges and material edges of such a sack bottom have height differences. In view of these height differences, the use of the illustrated counter-bearings 5 is very advantageous here.

Figure 8:
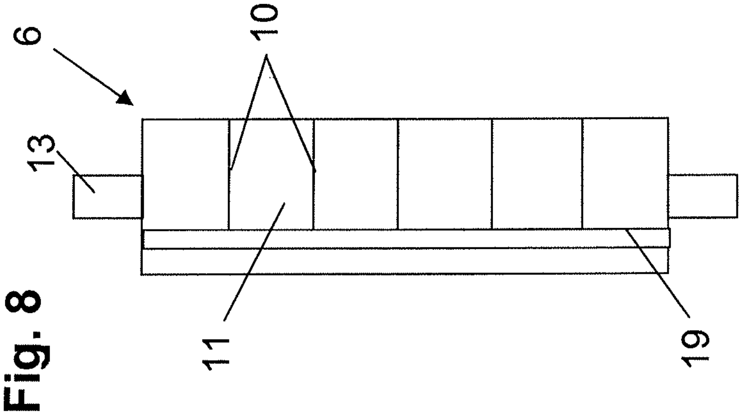
FIG. 8 shows the counter-bearing of a gluing station for slips

FIG. 8 shows a counter-bearing 5 that is substantially made of a roller. This roller comprises a segmented active surface 6 that is divided by slots 10 into surface segments 11. The surface segments are made of a resilient material that covers the circumferential surface of the roller serving as the counter-bearing 5.

Figure 10:
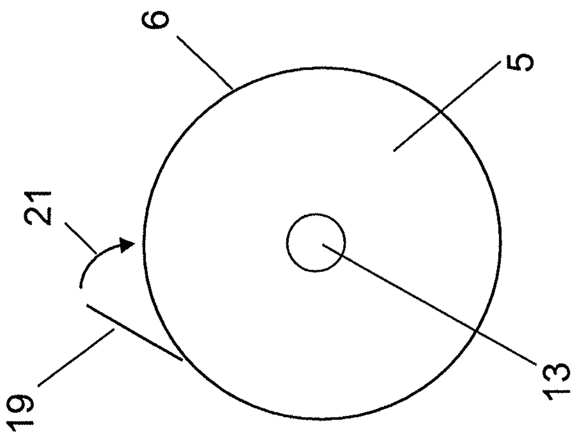
FIG. 10 is another view of the counter-bearing shown in FIG. 8
Figure 9:
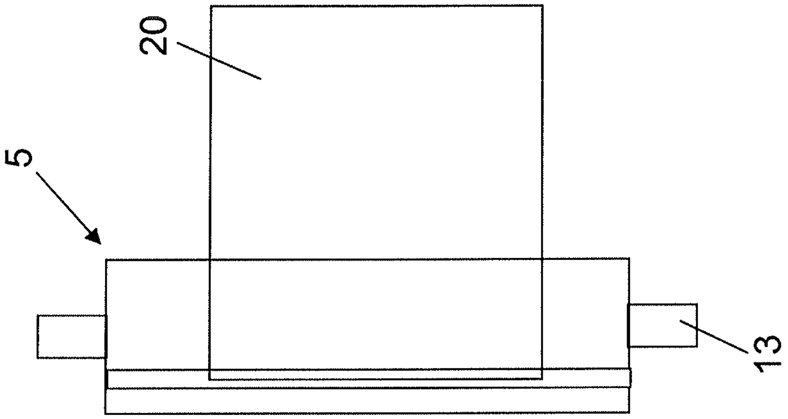
FIG. 9 shows the counter-bearing shown in FIG. 8 during the transport of a slip

The roller comprises a clamping strip 19 that can hold fast a sack component—particularly a slip—on the roller surface. The possible clamping movement of the clamping strip 19 is denoted by the arrow 21 in FIG. 10. FIG. 9 shows the manner in which a slip 20 is transported on the active surface 6 of the counter-bearing 5.

Figure 11:
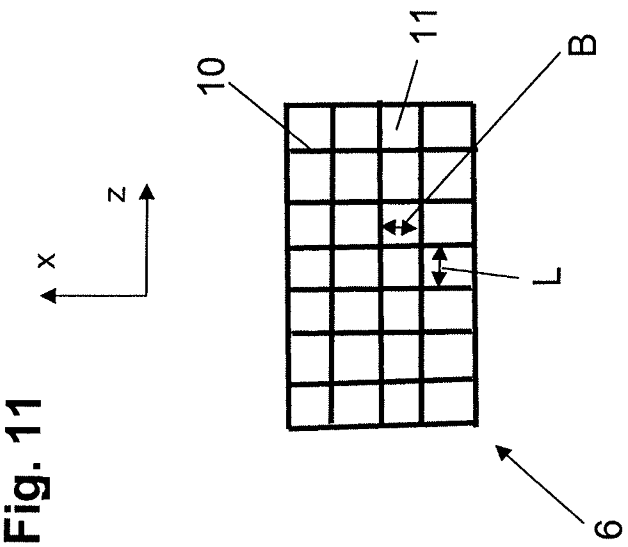
FIG. 11 is a top view of the counter-bearing of an additional gluing unit

FIG. 11 shows an additional active surface 6 when viewed from the application head 5, which active surface 6 comprises surface segments 11 that are delimited by the slots 10. The surface of the surface segments 11 that is oriented toward the sack components 2 is flexible. The surface segments themselves are positioned against the sack component by spring elements disposed on that side of the surface segments that is oriented away from the sack component. In this way also, a point-elastic positioning of the sack components against the nozzle bar 4 is achieved. With regard to the different active surfaces 6 composed of surface components of belts 14, it must be mentioned that the point elasticity is realized particularly when the belts 14 are oriented transversely to a linear nozzle bar 4.

Figure 12:
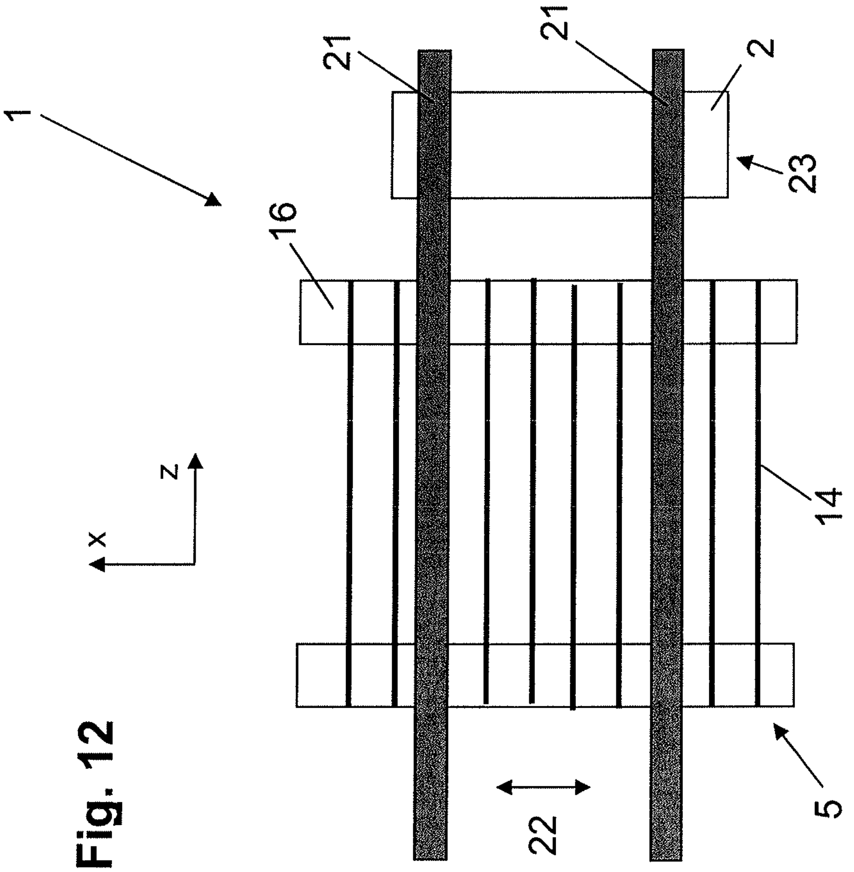
FIG. 12 is a top view of the counter-bearing of an additional gluing unit

FIG. 12 suggests an additional possibility of guiding the sack components 2 in a gluing unit 1. First, a counter-bearing 5 that largely corresponds to the counter-bearing 5 shown in FIGS. 5 and 6 is shown when viewed from the application head 3. Furthermore, the belts 21 are shown that are located in front of the belts 14 of the counter-bearing when viewed from the application head. During their transport through the gluing unit 1, the sack components 2 are held fast between the belts 14 and 21. Both types of belts are movable in the transport direction so that the sack components are entrained between the largely synchronously traveling belts. The belts 21 are movable in their position in the direction x extending transversely to the transport direction z of the sack components 2. The movability of the belts is ensured by means of measures that constitute standard practice in the field such as a movable suspension of the rollers guiding the belts.

It is advantageous to adjust the distance between the belts 21 from each other such that the belts grasp the end regions of the transported sack components in the x direction.

Figure 13:
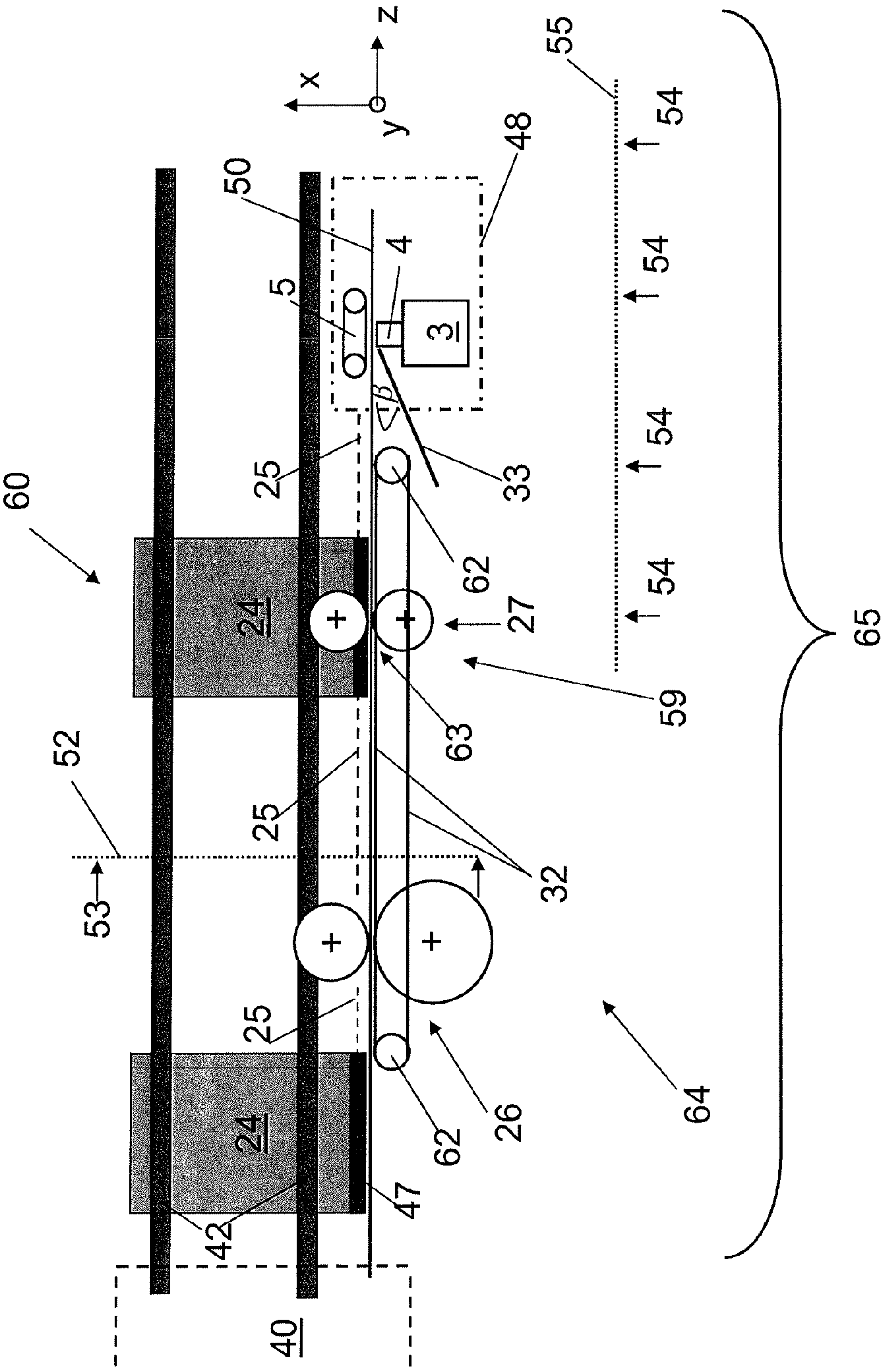
FIG. 13 is a sketch of the transport of the semi-finished sacks in a bottoming apparatus of the invention

FIG. 13 is a sketch of the transport of the semi-finished sacks in the region of the glue-application gap 43 in a bottoming apparatus 64 of the invention. The semi-finished sacks 24 are transported in the conveying direction z.

The sack bottom 17 is pulled up before the semi-finished sacks reach the creasing device.

The bottom flaps 47 of the lifted bottom squares 51 are now guided along the transport route 50 between the guide element 25 and the retaining belt 32. Only the regions of the individual processing stations 26, 27, 3 are an exception to this type of guidance. As a rule, the force for transporting the tubular pieces 24 is applied by the conveyor belt 42.

After the sack bottoms are opened, the semi-finished sacks 24 travel to the creasing station 26. In the creasing station 26, two crease lines—an upper 30 and a lower crease line 31 extending parallel to the sack-bottom centerline 28—are then impressed on the semi-finished sacks. The bottom flaps 29 of the sack bottom 17 that are formed by the creasing station are then calendered in the roller gap 63 of the press-forming device 27. The bottom flaps 47 travel along the further transport route 50 and into the feed region 41 of the guide element 25, which feed region tapers toward the glue-application gap 43 of the gluing device 3. The feed element 33 forms an angle β together with the guide element 25 of the semi-finished sacks 24. The angle β and the length of the feed element 33 must be selected such that the flaps of the sack bottoms can enter the feed region 41 of the guide element 25 without contact and the triangular pockets can be pressed against the feed element 33 as slowly as possible. The angle β in the exemplary embodiment shown here is therefore between 5° and 12°, and the length of the feed element 33 is between 200 mm and 300 mm.

Components of the semi-finished sacks that travel into the operating area of the feed element 33 are exposed to a continuously increasing pressing power.

After leaving the feed region 41, the components of the semi-finished sacks 24, to which glue is to be applied, travel into the glue-application gap 43. The figure does not show the addition of the bottom squares after the semi-finished sacks leave the glue-application gap 43, thus forming sack bottoms. Such sack bottoms are usually provided with bottom caps (additional semi-finished sack products), which can be carried out in the same way as the application of glue to the open bottom squares 51.

For representational reasons, the processing detail or processing stations disposed on the stand-up bottom side 60 of the bottoming apparatus 64 are not shown in FIG. 13.

Figure 14:
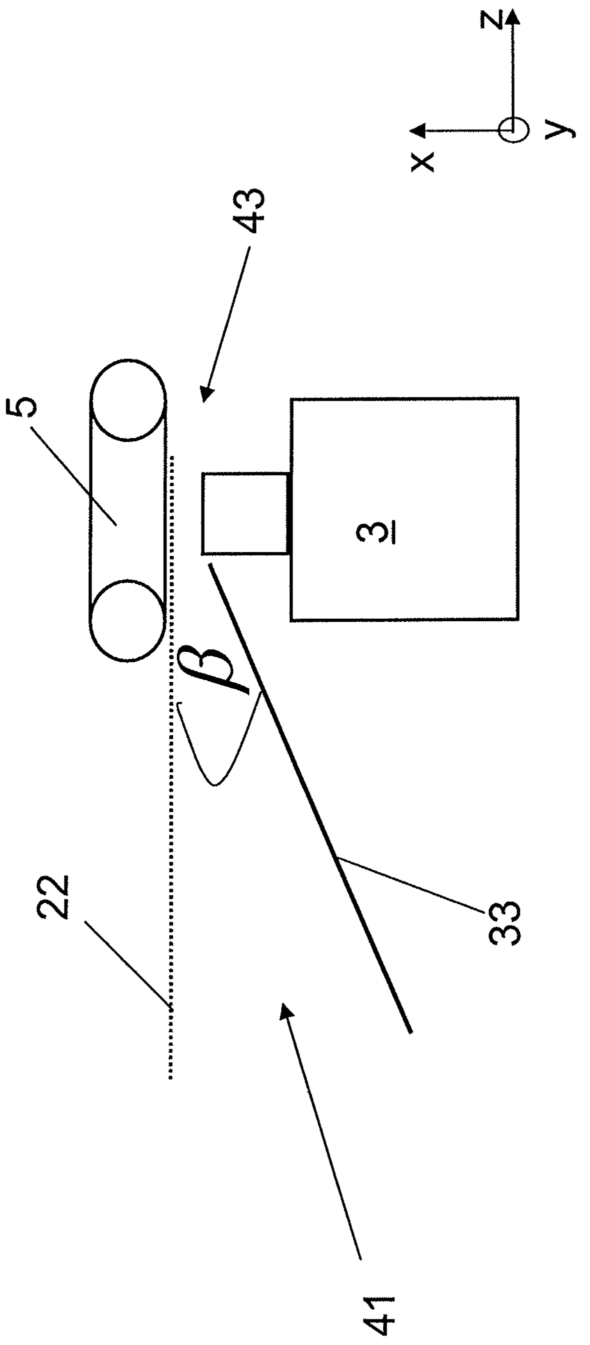
FIG. 14 is a section of FIG. 13

FIG. 14 shows a section of FIG. 13 that is located in the rectangle drawn in dashed lines 48. The feed region 41 disposed between the guide element 25 and the feed element 33 as well as the glue-application gap 43 disposed between the glue-application head 3 and the counter-bearing 5 can be identified more clearly with reference to this figure. For purposes of the entire document, the guide element 25 can be any component of the apparatus that guides or transports semi-finished sacks 24 to the application head 3. Of importance is the property of the guide element 25, by virtue of which it delimits the feed region 41 at the height of the feed element (in the transport direction z). The guide element 25 is a table sheet in the exemplary embodiment shown.

Unlike the feed region 41, the guide region 65 is the region of the bottomer 64, in which components of the open bottom square 51 are guided. Thus this region 65 extends in the transport direction z from the bottom-opening station 40 up to the station (not shown), at which the sack bottoms are added. The thickness of this region 65 is the distance between the guide elements here that enclose the semi-finished sacks during the guidance (mostly in the x or y direction). Large portions of the guide region 65 are identical to the transport route 50 of the bottom flaps 47.

Figure 15:
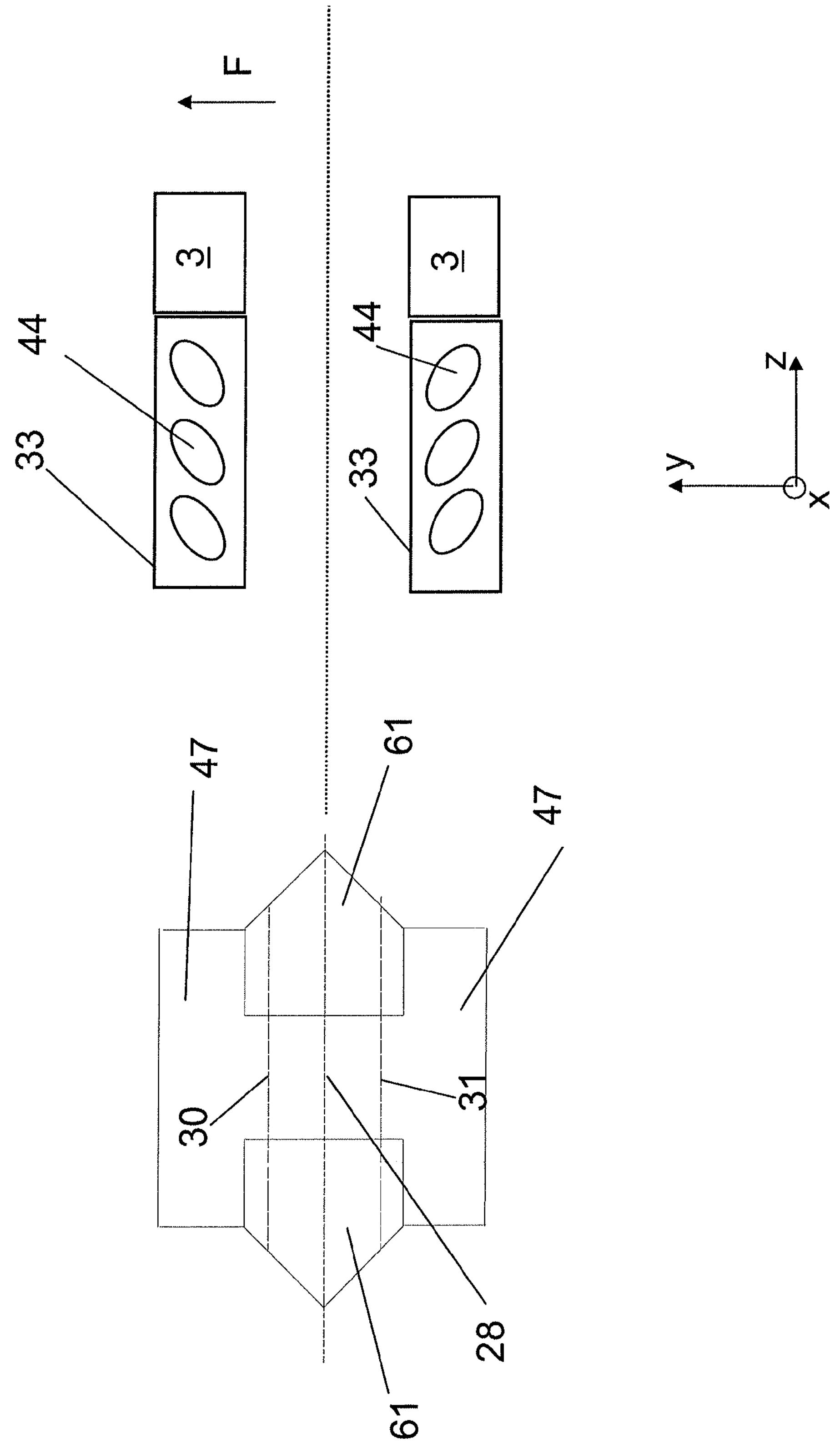
FIG. 15 is a second view of the transport of the semi-finished sacks in a bottoming apparatus of the invention

FIG. 15 shows the field of observation 55 (FIG. 13) from the angle of view denoted by the arrows 54 (FIG. 13). The figure clearly shows the open bottom square 51 of a semi-finished sack 24. In order to clearly enable a view of this bottom square, the press-forming device 27 and the conveying belt 32 are not shown in FIG. 15. The bottom flaps 47, the crease lines 30 and 31, the triangular pockets 61 as well as the bottom centerline 28 of the bottom square 51 can be seen in the figure. The further transport of the semi-finished sack or the route of the bottom centerline 28 through the gluing station is denoted by the dashed line 56 (transport route of the bottom centerline 28). Only the guide element 33 and the application head 3 of the gluing station can be seen. The recesses or elongated holes 44 are directed away from the bottom centerline 28. The longitudinal axis 66 of the recesses or elongated holes 44 forms an angle γ together with the sack-bottom centerline 28. The angle γ is approximately between 0° and 10°, more preferably between 3° and 8°. The width 67 of the recesses and elongated holes 44 is approximately between 3 mm and 20 mm, more advantageously between 4 and 12 mm. The recesses 44 apply a force to the bottom flaps 47 during their transport in the z direction, which force is directed away from the bottom centerline. This force F tightens the semi-finished sacks 24 to advantage. It actually turns out to be a positive aspect if the width-adjusting force F is applied in the feed region 41. This can be carried out by means of the surface structure of the elements 33, 25 that delimit the feed region 41.

Figure 16:
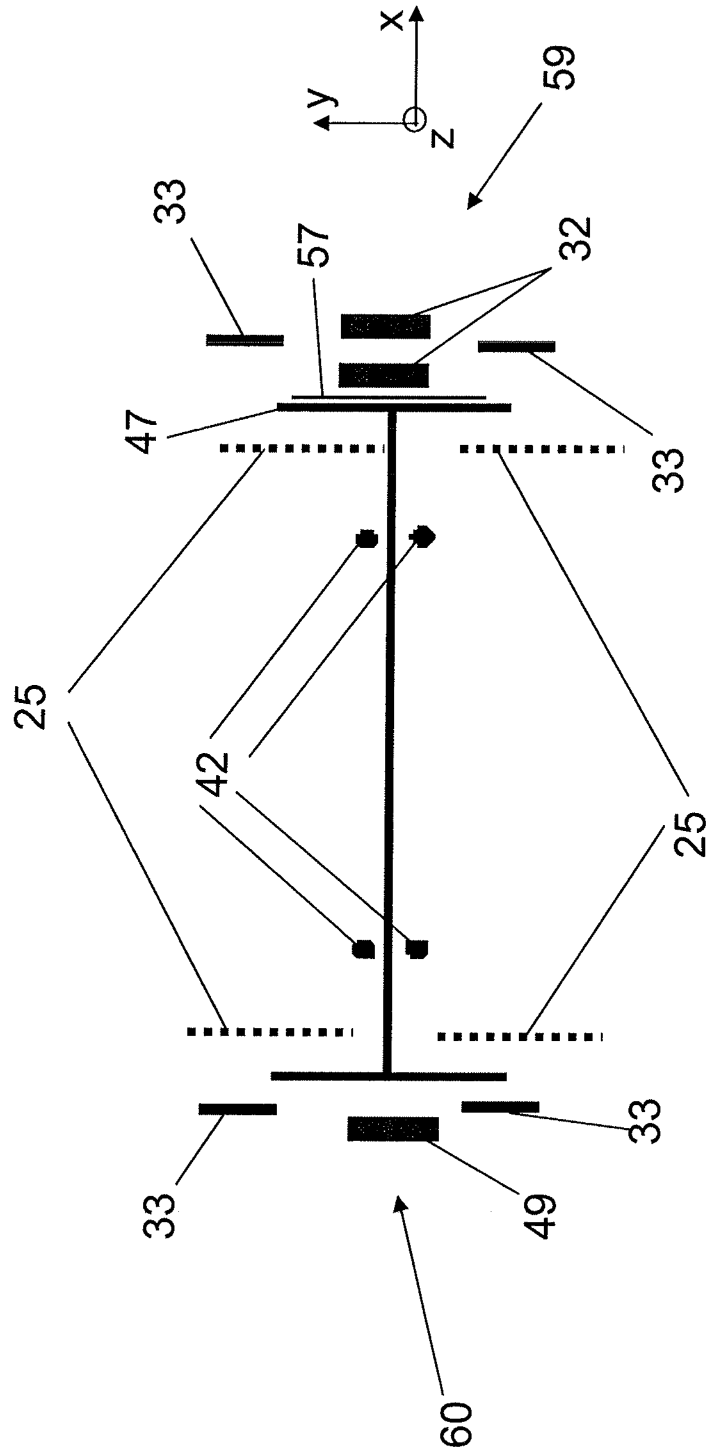
FIG. 16 is a third view of the transport of the semi-finished sacks in a bottoming apparatus of the invention

FIG. 16 once again shows the type of transport of the semi-finished sacks 24 between the bottom-opening station 40 and the location for adding the bottom squares 51, to which glue is applied. The viewing direction 53 and the plane of observation 52 taken as the basis for FIG. 16 are shown in FIG. 13. It can be seen that the bottom flaps 47 of the open bottom squares 51 are raised and guided by the guide elements 25. The right side of FIG. 16 shows a valve patch 57 being applied to the bottom square 51. The valve-gluing station that performs this process step is not shown in the figures. The retaining and conveying belt 32 is provided in order to guide the valve patch optimally. The guide rollers for this belt 32 are denoted by reference numeral 62. No such belt 32 is provided on the other side—the stand-up bottom side 60 of the bottomer 64 in this exemplary embodiment. Rather, the retaining function is performed here by the guide plate 49. This measure can make sense for cost reasons since this left side of FIG. 16 shows the side 60 of the machine on which the stand-up bottom of the sacks is produced. A valve patch 57 that can slip very easily is not inserted here. At this point, it should be mentioned once again that the figure does not show details of the production of the stand-up bottom shown in FIG. 13.

FIG. 16 does not show machine elements located behind the plane of observation 52. The front edges of the feed element 33 shown in FIG. 16 are an exception. It can therefore be seen that the operating area of the feed elements 33 is primarily located in the region of the bottom flaps 47 of the open bottom square 51. It must further be mentioned that the distances between the bottom flaps 47, valve patches 57, guide elements 25, guide belts 32 etc. are shown as being extremely large for representational reasons. FIG. 16 shows feed elements 33 on both sides of the semi-finished sacks 24 (valve bottom and stand-up bottom). It can also make sense to provide feed elements 33 only on the valve-bottom side 59.

FIG. 16 also shows that the central region of the semi-finished sack 24—here, the region of the tubular piece that subsequently forms the sack walls—is pooled between the conveyor belts 42 in the type of transport shown here. The conveyor belts 42 usually transfer the force required for transporting the semi-finished sacks 24. The retaining and conveying belt 32 can be driven likewise.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference numerals | |
|---|---|
| 1 | First gluing unit |
| 2 | Sack components |
| 3 | Application head |
| 4 | Nozzle bar |

-continued

| List of reference numerals |
| --- |
| 5 Counter-bearing |
| 6 Active surface of the counter-bearing 5 |
| 7 Reverse side of the sack components 2 |
| 8 Doctor blade device |
| 9 Doctor blade |
| 10 Slots |
| 11 Surface segments |
| 12 Glue-application gap |
| 13 Pin of the counter-bearing 5 |
| 14 Belts of the counter-bearing 5 |
| 15 Legs to which the belts 14 are articulated |
| 16 Guide rollers |
| 17 Sack bottom |
| 18 Cross-bottom valve sack |
| 19 Clamping strip |
| 20 Slip |
| 21 Belts |
| 22 Arrow |
| 23 End region in the x direction |
| 24 Semi-finished sacks |
| 25 Guide element |
| 26 Creasing station |
| 27 Press-forming device |
| 28 Sack-bottom centerline |
| 29 Bottom flap |
| 30 Upper crease line |
| 31 Lower crease line |
| 32 Retaining and conveying belt |
| 33 Feed element |
| 40 Bottom-opening station |
| 41 Feed region |
| 42 Conveyor belt |
| 43 Glue-application gap |
| 44 Elongated holes/recesses |
| 45 Slide plate |
| 47 Bottom flaps |
| 48 Rectangle drawn in dashed lines |
| 49 Additional guide plate |
| 50 Transport route (of the bottom flaps) |
| 51 Pulled-up bottom squares |
| 52 Plane of observation FIG. 16 |
| 53 Viewing direction FIG. 16 |
| 54 Viewing direction FIG. 15 |
| 55 Field of observation FIG. 15 |
| 56 Transport route of the bottom centerline 28 |
| 57 Valve patch |
| 58 Central (pooled) region of the semi-finished sack 24 |
| 59 Valve-bottom side of the bottomer |
| 60 Stand-up bottom side of the bottomer |
| 61 Triangular pockets |
| 62 Guide rollers of the conveying belt 32 |
| 63 Additional gap/gap of the press-forming device 27 |
| 64 Bottomer/bottoming apparatus |
| 65 Guide region |
| 66 Longitudinal axis of the recesses or elongated holes 44 |
| 67 Width of the recesses or elongated holes 44 |
| L Length of the surface segment 11 |
| B Width of the surface segment 11 |
| z Transport direction of the sack component 2/24 |
| x Direction extending transversely to the transport direction z |
| α Entry angle |
| β Angle formed between the guide element 25 and the feed element 33 |
| F Force/width-adjusting force |

What is claimed is:

1. An apparatus for processing semi-finished sacks, said apparatus comprising:

a gluing station having a glue-application head;

a transport medium that feeds the semi-finished sacks to the gluing station in a transport direction (z) such that the semi-finished sacks can be guided past the glue-application head; and a feed element, which is disposed upstream of and adjacent to a glue-application gap in the transport direction (z) of the semi-finished sacks, and which together with a guide element defines a feed region of the semi-finished sacks adjacent to the glue-application head, through which feed region at least components of the semi-finished sacks are guided, and which feed region tapers in the transport direction (z) of the semi-finished sacks, with an angle (β) between the guide element and the feed element in the tapering feed region being in a range of 1° to 45°.

2. The apparatus as defined in claim 1, further comprising a counter-bearing, which together with the glue-application head forms the glue-application gap, in which glue is applied to the semi-finished sacks as the semi-finished sacks travel past the application head.

3. The apparatus as defined in claim 1, wherein the gluing station is a gluing station configured to glue the sack bottom that is provided with a slip.

4. The apparatus as defined in claim 2, further comprising a second gap, which is disposed upstream of the feed element and the glue-application gap in the transport direction (z) of the semi-finished sacks and in which pressure is applied to at least a portion of surfaces to be glued.

5. The apparatus as defined in claim 4, further comprising a guide region for the semi-finished sacks, the guide region expanding downstream of the second gap in the transport direction (z) of the semi-finished sacks, in order to taper in a region of the feed element.

6. The apparatus as defined in claim 4, further comprising a guide region for the semi-finished sacks, the guide region having a consistent thickness for a defined distance upstream of the second gap in a region of areas to be glued in the transport direction of the semi-finished sacks.

7. The apparatus as defined in claim 1, wherein the angle (β) between the guide element and the feed element in the tapering feed region is in a range of 3° to 15°.

8. The apparatus as defined in claim 1, wherein the gluing station is configured to apply glue to an open bottom square, and further comprising a second feed element.

9. The apparatus as defined in claim 1, wherein the feed element is pliable from an original shape or position under an action of a force, and assumes the original shape or position after removal of the force.

10. The apparatus as defined in claim 9, wherein the feed element includes a sheet metal or a stainless steel.

11. The apparatus as defined in claim 1, wherein at least one of the feed element and the guide element includes recesses therein.

12. A gluing station for semi-finished sacks, said gluing station comprising:

a glue-application head;

a transport medium that feeds the semi-finished sacks to the gluing station in a transport direction (z) such that the semi-finished sacks can be guided past the glue-application head;

a feed element, which is disposed upstream of and adjacent to a glue-application gap in the transport direction (z) of the semi-finished sacks, and which together with a guide element defines a feed region of the semi-finished sacks adjacent to the glue-application gap, through which feed region at least components of the semi-finished sacks are guided, and which feed region tapers in the transport direction (z) of the semi-finished sacks, with an angle (β) between the guide element and the feed element in the tapering feed re ion being in a range of 1° to 45°.

13. A method of processing semi-finished sacks with a bottoming apparatus, the bottoming apparatus having a gluing station with a glue-application head, and the semi-finished sacks being fed to the gluing station and guided past the glue-application head by a transport medium, said method comprising:

feeding at least components of the semi-finished sacks to the glue-application head through a feed region thereof, and exposing at least the components of the semi-finished sacks to an increasing pressure as the components pass through the feed region, with the increasing pressure acting in a direction (y) extending transversely to a transport direction (z) of the components of the semi-finished sacks.

14. The method as defined in claim 13, wherein the components of the semi-finished sacks are adjusted relative to a width thereof in the feed region in the direction (y) extending transversely to the transport direction (z).

15. The method as defined in claim 14, wherein the components of the semi-finished sacks that are adjusted are bottom flaps, and the bottom flaps are adjusted relative to the width thereof in a direction of outer ends of the bottom flap.

16. The apparatus according to claim 1, wherein the apparatus is a bottoming apparatus for cross-bottom valve sacks.

17. The apparatus according to claim 4, wherein the gap is a roller gap.

18. The gluing station according to claim 12, wherein the angle (β) between the guide element and the feed element in the tapering feed region is in a range of 3° to 15°.

19. The apparatus according to claim 11, wherein the recesses are slots, holes, or elongated holes.

20. The gluing station according to claim 12, wherein the gluing station is configured for a bottoming apparatus for cross-bottom valve sacks.

* * * * *